United States Patent
Blum (10) Patent No.: US 9,017,560 B2
(45) Date of Patent: Apr. 28, 2015

(54) METHOD AND DEVICE FOR TREATING BALLAST WATER WITH ACROLEIN

(76) Inventor: Holger Blum, Teufen (CH)

( * ) Notice: Subject to any disclaimer, the term of this patent is extended or adjusted under 35 U.S.C. 154(b) by 711 days.

(21) Appl. No.: 13/375,221

(22) PCT Filed: May 28, 2010

(86) PCT No.: PCT/EP2010/003286
§ 371 (c)(1),
(2), (4) Date: Jan. 12, 2012

(87) PCT Pub. No.: WO2010/136220
PCT Pub. Date: Dec. 2, 2010

(65) Prior Publication Data
US 2012/0097620 A1    Apr. 26, 2012

(30) Foreign Application Priority Data

May 29, 2009 (DE) .......................... 10 2009 023 314
May 29, 2009 (DE) ..................... 20 2009 007 686 U
May 29, 2009 (DE) ..................... 20 2009 007 693 U
May 29, 2009 (DE) ..................... 20 2009 007 694 U (51) Int. Cl.
C02F 1/50     (2006.01)
C02F 1/68     (2006.01)
C02F 103/00   (2006.01)

(52) U.S. Cl.
CPC ............. C02F 1/50 (2013.01); *C02F 2103/008* (2013.01); *C02F 1/686* (2013.01)

(58) Field of Classification Search
CPC ....... C02F 1/50; C02F 1/686; C02F 2103/008
USPC ............. 210/764, 192, 198.1, 242.1; 422/162
See application file for complete search history.

(56) References Cited

U.S. PATENT DOCUMENTS

2010/0078368 A1* 4/2010 Blum .............................. 210/90

FOREIGN PATENT DOCUMENTS

DE          19935912 A1    1/2001
DE       202007004912 U1    7/2007

OTHER PUBLICATIONS

International Search Report for PCT/EP2010/003286 dated Apr. 4, 2011.

*Primary Examiner* — Lucas Stelling
(74) *Attorney, Agent, or Firm* — Nixon Peabody LLP; Joseph Bach, Esq.

(57) ABSTRACT

A apparatus for treating ballast water with acrolein which is to be connected to a main ballast water line of a ballast water unit, comprises a reactor device to which acrolein derivate and water is to be fed for generating an aqueous acrolein solution, a branch line which is connected to the main ballast water line for branching off a partial ballast water stream, and a mixing device which is connected to the branch line and an acrolein solution supply line from the reactor device and is designed for diluting the aqueous acrolein solution from the reactor device, and a feed device for supplying the aqueous acrolein solution from the mixing unit to the main ballast water line. In the method for treating ballast water with acrolein, an acrolein derivate and hydrolysis water are mixed in a reactor device for generating an aqueous acrolein solution, a partial water stream branched of from the main ballast water stream at an branching location, is mixed with the acrolein solution supplied from the reactor device and mixed thereby, and the partial ballast water stream treated with the acrolein solution is fed back to the main ballast water stream downstream of the branching location.

12 Claims, 4 Drawing Sheets

METHOD AND DEVICE FOR TREATING BALLAST WATER WITH ACROLEIN

RELATED APPLICATIONS

This application is a National Phase of International Application No. PCT/EP2010/003286, entitled "APPARATUS AND DEVICE FOR TREATING BALLAST WATER WITH ACROLEIN", which was filed on May 28, 2010, and which claims priority of German Patent Application No. 10 2009 023 314.8, filed on May 29, 2009, German Patent Application No. 20 2009 007 693.8, filed on May 29, 2009, German Patent Application No. 20 2009 007 694.6, filed on May 29, 2009, and German Patent Application No. 20 2009 007 686.5. filed on May 29, 2009, and the disclosures of which are hereby incorporated by reference herein in their entirety.

BACKGROUND OF THE INVENTION

The invention pertains to a method and an apparatus for treating ballast water with acrolein, as well as a mixing device, a feed device and a reactor device for an apparatus for treating ballast water with acrolein.

It is already known that ballast water can be disinfected on ships by use of acrolein. Already by adding 5 to 15 ppm acrolein to the ballast water, bacteria, algae, zebra mussels and other organisms of the zooplankton can be killed, and, thereby, the transfer from one port to another one can be surely eliminated. The advantage of the use of acrolein is the sustain ability in particular with respect to larvae of zebra mussels, and the fact that acrolein disintegrates by itself within a few days, i.e. no new burden of the port basin by this biocide is encountered upon discharging of the ballast water in the port of destination.

These advantages are accompanied by the fact that the handling, the transportation and the storage of pure acrolein cannot be carried out on ships because acrolein is a highly poisonous liquid doing the effects of teargas, and that the personnel on board would be forced to carry out the handling of this biocide only with a complete ABC protective clothing and using gasmasks.

Aqueous solutions of acrolein are not poisonous and can be safely handled, however, such solutions can only be handled during a few days such that the use on ships is impossible because of logistic problems.

From DE-GM 20 2007 004 912, a apparatus is known in which the ballast water is pumped by means of a pressure rising pump through a water jet pump, and the low pressure zone of the water jet pump is hydraulically connected via a control valve to a reaction container which has separate inlet openings for acrolein acetal, acid and hydrolysis water applied on the outside. In the reaction container, an aqueous acrolein solution is generated which is mixed to the ballast water in the water jet pump such that the organisms in the ballast water are killed by the acrolein. In the apparatus of DE-GM 20 2007 004 912, acrolein acetal can be used directly without a previous mixing with a solution agent being necessary. The same is true for the acid used as a catalyst which acid can be dosed into the apparatus without previous dissolution with water. The hydrolysis water is taken from the water apply system on board. Although the problem with the handling, the transport and the storage of pure acrolein on ships is solved in this apparatus, there are problems of the dimensioning, in particular of the water jet pump and the reaction container, with increasing requirements of throughput.

SUMMARY OF THE INVENTION

It is the object of the invention, to provide a method and an apparatus simple in construction whereby the ballast water can be treated with acrolein on board of ships also with large quantities of throughput with an acceptable construction complexity.

For achieving the object, the apparatus of the invention for treating ballast water with acrolein which is to be connected to the main ballast water line of a ballast water installation, a reactor device which is to be fed with an acrolein derivative, preferably acrolein acetal, catalyst acid and water for generating an aqueous acrolein solution, a branch line which is connected to the main ballast water line for branching off a ballast water partial stream, and a mixing device with is connected to the branch line and the acrolein solution supply line from the reactor device and is designed for diluting the aqueous acrolein solution from the reactor device, and a feed device for supplying the aqueous acrolein solution from the mixing device to the main ballast water line.

An advantageous embodiment of the invention is characterized in that the reactor device comprises a generator having at least a connecting stub for acrolein derivative and a connecting stub for pure water and an outlet stub for acrolein solution wherein the generator is designed for a preliminary mixing of the acrolein derivative with water, and a hose reactor having an inlet stub connected to the outlet stub of the generator by means of a conduit, and an outlet stub for advancing the treated acrolein solution and the volume of which is designed for providing a retention time of the acrolein solution in the hose reactor within which time the solution and the hydrolysis respectively of the acrolein derivative in water is completed.

An advantageous embodiment of the invention is characterized in that the mixing device comprises a mixing nozzle having an inlet cone becoming narrower in the flow direction which has an input stub for connection to a pressurized water line, an outlet cone widening in the flow direction having an outlet stub for the connection of a line for feeding the aqueous acrolein solution from the mixing unit to a destination location, as well as a suction stub leading to the low pressure region of the mixing nozzle which is connected to an acrolein solution feeding line from a reactor device for generating an aqueous acrolein solution, and a pressure rising pump which is arranged upstream of the mixing nozzle and is connected to a ballast water branch line which is a branch line from the main ballast water line for a partial stream of the ballast water, whereby the power of the pressure rising pump is dimensioned in relation to the narrowing of the inlet cone of the mixing nozzle such that the nominal power of the pressure rising pump in the area of the mixing nozzle in between the inlet cone and the outlet cone a speed of the water stream of 20 to 25 msec can be achieved.

An advantageous embodiment of the invention is characterized in that the feeding unit comprises an annular nozzle which is dimensioned for usage in the main ballast water line, wherein the annular nozzle comprises a nozzle ring comprising a plurality of nozzle openings distributed over the interior circumference of the nozzle ring.

It is also an object of the invention, to provide a reactor device apparatus simplified in construction for generating an aqueous acrolein solution for an apparatus for treating ballast water with acrolein whereby the ballast water can be treated with acrolein on board of ships the use of which device is ensured also with large quantities of throughput with an acceptable construction complexity.

For achieving this objective, an inventive reactor device for generating an aqueous acrolein solution for an apparatus for treating ballast water with acrolein is provided comprising a reactor device comprises a generator having at least a connecting stub for acrolein derivative and a connecting stub for pure water and an outlet stub for acrolein solution wherein the generator is designed for a preliminary mixing of the acrolein derivative with water, and a hose reactor having an inlet stub connected to the outlet stub of the generator by means of a conduit, and an outlet stub for advancing the treated acrolein solution and the volume of which is designed for providing a retention time of the acrolein solution in the hose reactor within which time the solution and the hydrolysis respectively of the acrolein derivative in water is completed. By means of the inventive reactor device, it is achieved in an advantageous way that the generator itself does not have to have a large volume because a part of the reaction of the acrolein derivative with water takes place in the subsequent hose reactor. As the generator is usually installed on deck while the hose of the hose reactor leads from the deck to the ballast water tank, the hose reactor provides enough volume for taking up the required amount of hydrolysis water and acrolein derivative and a sufficient retention time of this mixture in the generator and the hose reactor such that, at the output of the hose reactor, an acrolein solution is at hand in which the hydrolysis of the acrolein derivative in the water is completed.

An advantageous embodiment of the inventive reactor device is characterized in that the generator comprises a further connection stub for a disintegration catalyst. It is advantageous to feed also the disintegration catalyst into the generator in order to obtain a complete mixing of the starting materials for the acrolein solution already there.

A further advantageous embodiment of the inventive reactor device is characterized in that the generator comprises a boxlike container having a volume of about 4 to 6 liter. Because of the above explained concept of the invention, the generator itself can be dimensioned only with 4 to 5 liters if a part of the ballast water stream of 500 $m^3$/h is present to which the acrolein solution which is output from the hose reactor, is mixed.

A further advantageous embodiment of the inventive reactor device is characterized in that the hose reactor comprises the shape of a single layer, cylindric hose winding. Thereby, the hose reactor is embodied as a compact unit such that it can be provided at any arbitrary location between the deck of the ship and the ballast water tank where this hose reactor is at least interfering.

A further advantageous embodiment of the inventive reactor device is characterized in that the hose reactor comprises at least one half of a hose winding. By forming the hose reactor as a coil having at least on half of a coil winding the mixing of the components for the acrolein solution is promoted also within the hose reactor tube.

A further advantageous embodiment of the inventive reactor device is characterized in that the tube of the hose reactor has a length of 30 to 40 m and an inner diameter of 20 mm to 40 mm for the usage that a main ballast water stream of 5.000 $m^3$/h is to be treated with acrolein. This dimensioning of the hose reactor is advantageous in order to ensure the desired retention time of the acrolein solution and the components thereof, respectively, in the hose reactor. With the stated dimensioning of the hose reactor, a content of the hose reactor of about 10 liter to 20 liter is resulting which has to be taken into account on computing the total retention time of the acrolein solution in the generator and the hose reactor. With smaller main ballast water streams, the hose is dimensioned accordingly wherein the desired concentration of the acrolein in the ballast water of 15 ppm is the bench mark.

A further advantageous embodiment of the inventive reactor device is characterized in that the hose reactor consists of a plastic material, preferably polyethylene or poly-tetra-flour-ethylene. The plastics material is particularly adapted for the hose reactor because it is hardly attacked by the acrolein solution.

A further advantageous embodiment of the inventive reactor device is characterized in that the hose reactor is provided with a steel reinforcement. By means of the steel enforcement, the hose reactor can, in an advantageous way, also be subjected to a certain pressure without a source of danger being created.

It is also an object of the invention, to provide a mixing device simple in construction for an apparatus for treating ballast water with acrolein, the efficiency of which device is optimized also with large quantities of throughput.

For achieving this objective, an inventive mixing device for an apparatus for treating ballast water with acrolein is provided comprises a mixing nozzle having an inlet cone becoming narrower in the flow direction which has an input stub for connecting to a pressurized water line, an outlet cone widening in the flow direction having an outlet sub for the connection of a line for feeding the aqueous acrolein solution from the mixing unit to a destination location, as well as a suction stub leading to the low pressure region of the mixing nozzle which is connected to an acrolein solution feeding line from a reactor device for generating an aqueous acrolein solution, and a pressure rising pump which is arranged upstream of the mixing nozzle and is connected to a ballast water branch line which is a branch line from the main ballast water line for a partial stream of the ballast water, whereby the power of the pressure rising pump is dimensioned in relation to the narrowing of the inlet cone of the mixing nozzle such that the nominal power of the pressure rising pump in the area of the mixing nozzle in between the inlet cone and the outlet cone a speed of the water stream of 20 to 25 m/sec can be achieved.

From the flow equations of Bernoulli and Venturi, the relationship between the speed of the flow of water upon exiting a restriction area, the dimensions of a conduit for the flow and the pressure as well as the speed of the flow in front of the nozzle is known. Therefore, the pressure can be calculated from the known dimensions of the ballast water line and the dimensions of the mixing nozzle which pressure is required in order to achieve a speed of the water flow of 20 to 25 m/sec at the exit of the inlet cone. This speed of the water stream of the outflowing water has the advantageous effect that the acrolein solution supplied by the acrolein solution supply line is suddenly, which means within milliseconds, diluted in such an amount that the acrolein remains stable in the solution up to several days.

An advantageous embodiment of the inventive mixing device is characterized in that the pressure rising pump is dimensioned to a power of 45 kW with a throughput of 500 $m^3$/h and a flow speed of 2 to 3 m/sec in an input line and an output line of the pressure elevation pump. This dimensioning of the pressure rising pump is advantageous in that a main ballast water stream of about 5000 $m^3$/h can be treated if the mixing device has a throughput of 500 $m^3$/h.

A further advantageous embodiment of the inventive mixing unit is characterized in that the inlet cone of the mixing nozzle has a cone angle between 18 and 22 degrees, and the outlet cone of the mixing nozzle has a cone angle between 9 and 11 degrees. This arrange of the cone angles for the inlet cone and the outlet cone is advantageous in such cases where the water stream contains a certain amount of solid particles, as for example with ballast water, whereby, on the one hand, a good efficiency of the mixing nozzle and, on the other hand, a long life of the mixing nozzle is achieved.

A further advantageous embodiment of the inventive mixing unit is characterized in that the inlet cone of the mixing nozzle comprises a cone angle of 20 degrees and the outlet cone of the mixing nozzle comprises a cone angle of 10 degrees. These values for the cone angles for the inlet cone and the outlet cone have been proven as being optimal for the special usage of the inventive mixing unit for a apparatus for treating ballast water with acrolein.

A further advantageous embodiment of the inventive mixing unit is characterized in that the inlet cone has a diameter ratio in flow direction from the inlet to the outlet, i.e. a reduction of 2:1 and the outlet cone has a diameter ratio in flow direction from the inlet to the outlet, i.e. a widening, of about 1:2, and that the diameter of the inlet cone and its inlet and the diameter of the outlet cone had its outlet as the same size as the diameter of the connected tube line. This dimensioning of the inlet cone and the outlet cone in connection with the diameter of the connected tube line results in a good efficiency, at the one hand, and in a construction height of the mixing nozzle as small as possible, on the other hand.

A further advantageous embodiment of the inventive mixing unit is characterized in that the mixing nozzle has a further suction stub which is connected with a tank for an disintegration accelerator through a tube line. Thereby, in an advantageous way, not only the acrolein solution but also additionally a disintegration accelerator can be fed into the mixing nozzle together with the fluid fed from the pressure rising pump an can be mixed thereto. The connection of the tank for a disintegration accelerator to the mixing nozzle is, furthermore, also advantageous in the sense that the feeding of the disintegration accelerator can be made independently from other functions of the mixing unit and the apparatus for treating ballast water with acrolein.

A further advantageous embodiment of the inventive mixing unit is characterized in that an intermediate element is provided between the inlet cone and the outlet cone. This arrangement of the mixing nozzle means that the mixing nozzle can be assembled in an advantageous, modular technology such that the maintenance and the replacement of parts of the mixing nozzle can be carried out in a simple way.

A further advantageous embodiment of the inventive mixing unit is characterized in that the intermediate element comprises the suction stub for the acrolein solution and, if provided, the suction stub for the disintegration accelerator. Thereby, the acrolein solution and the disintegration accelerator are input in an advantageous way into the low pressure area of the mixing nozzle at the same level, and are mixed with the ballast water stream in the mixing nozzle.

A further advantageous embodiment of the inventive mixing unit is characterized in that a separation unit serving for the physical separation of the suspended solid particles of the ballast water partial stream, is provided in the ballast water branch line, which separation unit is arranged in advance of the mixing nozzle as seen in flow direction. Such a separation unit provides that the lifetime of the pressure rising pump and the lifetime of the mixing nozzle is prolonged since the water flowing in these constructual components contains fewer solid particles and, therefore, causes less wear debris.

A further advantageous embodiment of the inventive mixing unit is characterized in that the separation unit comprises a centrifugal force separator or a sludge filter. The centrifugal force separator, for example a hydro cyclone device, and the sludge filter can be operated with a high throughput which has to be taken into account with this special usage.

It is also an object of the invention, to provide a feed device simple in construction with which ballast water may be treated with acrolein, where the usage of which device is also guaranteed with large quantities of throughput with justifiable construction effort.

For achieving this objective, an inventive feed device for feeding aqueous acrolein solution to a main ballast water line of an apparatus for treating for an apparatus for shops for treating ballast water with acrolein is characterized by an annular nozzle which is dimensioned for usage in the main ballast water line, wherein the annular nozzle comprises a nozzle ring comprising a plurality of nozzle openings distributed over the interior circumference of the nozzle ring. By means of the ring nozzle having a plurality of nozzle openings distributed over its interior circumference, the acrolein solution can be fed to this main ballast water stream simultaneously over the entire circumference of the main ballast water stream such that a unitary feeding of acrolein solution at the circumference of the main water stream is effected whereby a unitary and good mixing of the acrolein solution with the main ballast stream is made possible. A unitary mixing of the two streams is essential for the desired effect of the acrolein, i.e. killing of the living organisms in the main ballast water stream.

An advantageous embodiment of the inventive feed device is characterized in that the plurality of the nozzle openings distributed over the interior circumference of the ring nozzle are arranged under equal distances whereby a uniform distribution of the acrolein solution streams in the main ballast water stream is obtained in an advantageous way.

A further advantageous embodiment of the inventive feed device is characterized in that the interior diameter of the ring nozzle is adapted to the interior circumference of the main ballast water line of the main ballast water stream. Therein, it is advantageous that the main ballast water stream can flow unobstructed so that no solid components of the main ballast water stream can accumulate in front or behind the ring nozzle. Also, the lifetime of the ring nozzle is prolonged thereby.

A further advantageous embodiment of the inventive feed device is characterized in that the feeding unit comprises additionally a flow interfering device arranged at the ring nozzle which stream interfering device is located downstream of the ring nozzle in direction of a main ballast water stream flowing in the main ballast water line. By means of the flow interfering device, the final mixing between the acrolein solution stream and the main ballast water stream is achieved in an advantageous way. That the fluid control device is formed separately from the ring nozzle has the advantage that the stream interfering device can be replaced easily when it is damaged or weared by the main ballast water stream.

A further advantageous embodiment of the inventive feed device is characterized in that the flow interfering device comprises a mixing face plate having an opening for the main ballast water stream, wherein the opening has a smaller opening area than the free inner cross section area of the main ballast water line. The flow interfering device can be any flow guiding device, a diffuser or the like. The embodiment of the flow interfering device is a mixing face plate is a constructually simple and very efficient solution for the flow interfering device which ensures, at the one hand, the purpose of mixing the acrolein solution stream with the main ballast water stream and, on the other hand, is easily to be handled in case of a required exchange.

A further advantageous embodiment of the inventive feed device is characterized in that the opening of the mixing face plate is not circular. The mixing function of the mixing face plate is improved by means of the non circular cross-section in comparison to the mixing effect of a mixing face plate having a round opening.

A further advantageous embodiment of the inventive feed device is characterized in that the feeding line of the ring nozzle is formed as an injector line which is tangentially arranged at the ring nozzle. In this case, it is advantageous that the acrolein solution is introduced tangentially into the ring nozzle such that a circular stream is resulting in the ring nozzle which circular stream provides for a unitary distribution of the acrolein solution at the output openings of the ring nozzle.

It is also an object of the invention, to provide a method by which ballast water on board of ships may be treated with acrolein also in case of large quantities of throughput with justifiable construction effort.

For achieving this objective, a method for treating for ballast water with acrolein is provided in which an acrolein derivative and hydrolysis water are mixed in a reactor device for generating an aqueous acrolein solution, a partial ballast water stream branched off from the main ballast water stream at a branching location, is mixed and diluted thereby with the acrolein solution fed from the reactor device, and wherein the partial ballast water stream is fed to the main ballast water stream downstream of the branching location. Thereby, with large throughput amounts in the main ballast water line of up to 5.000 $m^3/h$, it is achieved that the acrolein is generated anyway in a comparatively small system and can be fed in a sufficient amount to the main ballast water stream. Also the problem of a sufficient water supply to the system for mixing down of the acrolein solution is solved in an advantageous way by using a part of the main ballast water stream.

An advantageous embodiment of the inventive method is characterized in that an additional disintegration catalyst is fed to the reactor device for generating an aqueous acrolein solution in order to accelerate the hydrolysis of the acrolein derivative which has an advantageous effect on the length of the required retention time of the acrolein solution in the reactor device.

A further advantageous embodiment of the inventive method is characterized in that a disintegration accelerator is additionally fed to the partial ballast water stream which has an advantageous effect in the sense that eventually present remaining amounts of the acrolein derivative dissolve before the partial ballast water stream is mixed into the main ballast water stream.

A further advantageous embodiment of the inventive method is characterized in that a partial ballast water stream of about 10% of the main blast water stream is branched of which is, at the one hand, sufficient for the water supply of the system and, on the other hand, limits the constructual effort of the system.

A further advantageous embodiment of the inventive method is characterized in that, if the nominal content of the acrolein in the acrolein treated main ballast water stream amounts to a concentration of about 5 to 15 ppm and the partial ballast water stream is 10% of the main ballast water stream, the ratio of acrolein derivative and hydrolysis water at the reaction unit is selected such that the acrolein solution leaving the reactor device has a concentration of 150000 ppm acrolein, and that the partial ballast water stream after mixing with the acrolein solution has a concentration of 50 to 150 ppm acrolein. For higher or lower concentrations of the acrolein in the main ballast water stream, this dimensioning rule can be modified accordingly.

A further advantageous embodiment of the inventive method is characterized in that the acrolein solution exiting the reactor device is diluted upon mixing with the partial ballast water stream in a ratio of 1:500 to 1:1000 by means of the partial ballast water stream and that the partial ballast water stream treated with the acrolein is diluted in a ratio of about 1:5 to 1:10 by means of the main ballast water stream if the nominal content of the acrolein in the main ballast water stream treated with acrolein amounts to about 5 to 15 ppm and the partial ballast water stream is 10% of the main ballast water stream. Therefore, a three-step delusion of the acrolein takes place: a first delusion in the reactor device by the hydrolysis water to a 5 to 15% acrolein solution, a second delusion upon mixing the acrolein solution coming from the reaction unit and a third delusion upon entering of the partial ballast water stream treated with the acrolein, into the main ballast water stream. Thereby, a good economy of the method is achieved.

A further advantageous embodiment of the inventive method is characterized in that, for mixing the partial ballast water stream and the acrolein solution, a mixing nozzle of the type of a water jet pump operated by the partial ballast water stream is used to the low pressure zone of which the acrolein solution and, if applicable, the disintegration accelerator is/are fed. Thereby, a good mixing of the acrolein solution and the partial ballast water stream can be achieved.

A further advantageous embodiment of the inventive method is characterized in that the pressure and the flow speed of the partial ballast water stream are selected such that a water flow speed of 20 to 25 msec is achieved in the mixing nozzle. The water stream speed of 20 to 25 msec in the mixing nozzle is sufficient in order to suck in the acrolein solution from the reactor device and the disintegration accelerator, and it assures an immediate mixing of the supplied media in milliseconds which is important for stabilizing the acrolein.

A further advantageous embodiment of the inventive method is characterized in that a pressure rising pump of a nominal power of 45 kW if a throughput of 500 $m^3/h$ and a flow speed of 2 to 3 msec in the partial ballast water stream is given, in order to achieve a water stream speed of 20 to 25 msec in the mixing nozzle. This dimensioning rule can be applied accordingly to other throughput amounts.

A further understanding of the nature and advantages of the embodiments of the present invention may be realized by reference to the remaining portions of the specification and the drawings.

DESCRIPTION OF THE SPECIFIC EMBODIMENTS

Figure 1:
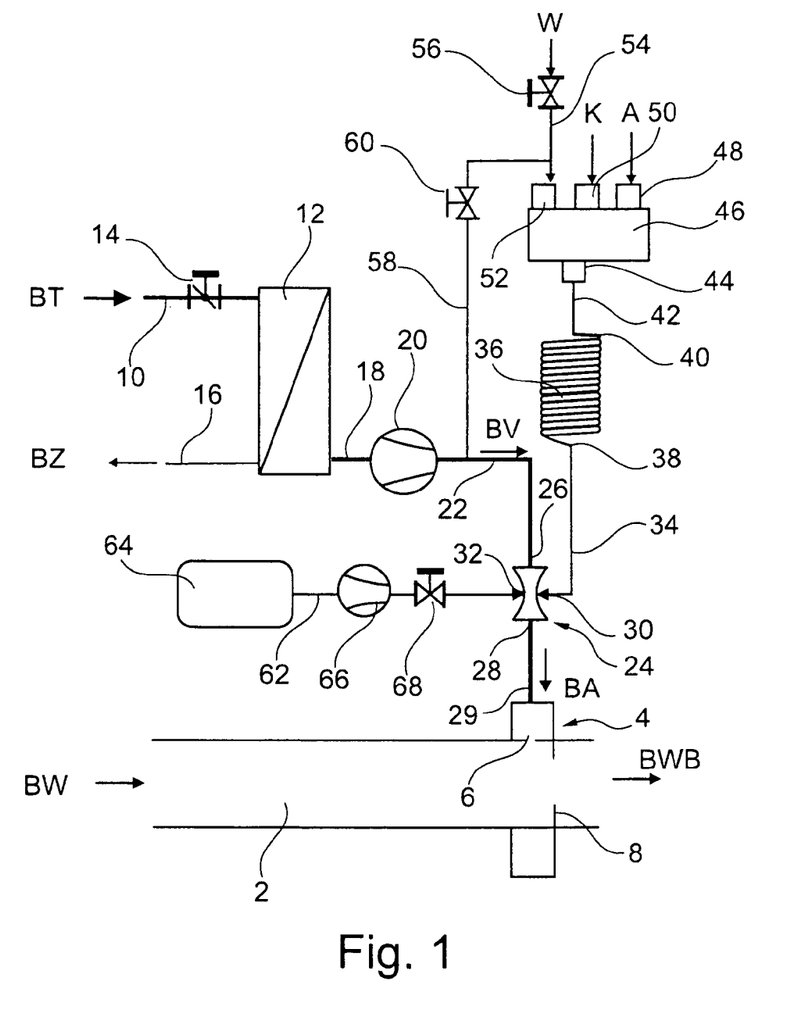
FIG. 1 shows schematically a first embodiment of the complete apparatus.

FIG. 1 schematically shows an apparatus for treating ballast water with acrolein in which the inventive reactor, the inventive mixing device and the inventive feed device are employed. It is to be noted that the inventive reactor, the inventive mixing device and the inventive feed device may also be used independently from the total apparatus shown in FIG. 1.

As can be seen from FIG. 1, the main ballast water stream (volume/unit of time) BW of the ballast water to be treated with acrolein, flows through the main ballast water line 2 to a feed device, a ring nozzle 4 with a nozzle ring 5 at the inside of which at least one nozzle opening 6, preferably a plurality of nozzle openings 6 arranged under equal spaces, are provided.

Furthermore, the feeding unit comprises a flow interfering device located downstream from the ring nozzle 4 as viewed in the direction of the main ballast water stream. The flow interfering device may be a restriction, a flow guiding device or another obstacle whereby the main ballast water stream coming from the ring nozzle, is whirled up and mixed thereby. A preferred shape of the flow interfering device is a mixing face plate 8 shown in FIG. 1 through which the ballast water flows which exits the ring nozzle 4. By means of the mixing face plate 8, the free cross-section of the main ballast water line 4 is narrowed down, and a hydraulic overpressure is generated in front of the face plate 8 which leads to a turbulence in the ballast water stream which leads to a fast and good mixing of the main ballast water stream BW with ballast water pretreated with acrolein.

A stream (volume/unit of time) BA of acrolein treated water flows simultaneously through the nozzle openings 6 to the inside and meets the main ballast water stream BW. The complete and instantaneous mixing of the main ballast water stream BW and the water stream BA pretreated with acrolein by means of the mixing face plate 8 provides, as a sum, the ballast water discharge stream BWB.

The apparatus comprises, furthermore, a branch line 10 branching off from the main ballast water line 2 downstream from the ballast water feed pump (not shown) through which ballast water is supplied to the ballast water tanks of the ship, and upstream of the feed device and by which branch line a partial ballast water stream BT is supplied to the ballast water treatment apparatus. The branch line 10 leads to a separation unit 12 serving for the physical separation of the sludge portion and the suspended solid particles, respectively of the partial ballast water stream BT. A control valve 14 is provided in the branch line 10 in order to control the amount of the partial ballast water stream BT entering the separation unit 12. A sludge water stream BZ separated in the separation unit 12 leaves the apparatus through a discharge line 16. The separation unit 12 carries out a physical separation of suspended solid particles from the partial ballast water stream BT by means of a centrifugal force and/or filtration.

The partial ballast water stream BV which was previously physically cleaned by means of the separation unit 12, flows through a clear water line 18 to a suction port of a pressure rising pump 20. A pressurized water line 22 runs from the pressure rising pump 20 to the mixing nozzle 24 in order to supply the partial water stream BV which is coming from the pressure rising pump 20 and has previously been physically cleaned, to an input stub 26 of the mixing nozzle 24 in which the partial water stream BV is mixed with aqueous acrolein solution and diluted thereby such that the acrolein in the acrolein solution is not disintegrating.

The mixing nozzle 32 is a water jet pump with a nozzle area having a hydraulic overpressure. The mixing nozzle 24, furthermore, has a discharge stub 28 which is connected with the ring nozzle 4 via a line 29, and to vacuum stubs 30, 32.

The power of the pressure rising pump 20 is dimensioned depending on the narrowing down of the inlet cone of the mixing nozzle such that, with a nominal power of the pressure rising pump, a water stream flow speed of 20 to 25 m/sec is achieved in the area of the mixing nozzle between the inlet cone and the outlet cone. The pressure rising pump 20 is dimensioned to a power of 45 kW at a throughput of 500 m$^3$/h and a flow speed of 2 to 3 m/sec in an inlet line and an outlet line of the pressure rising pump.

The mixing nozzle 24 has, furthermore, an outlet stub 28 which is connected with the ring nozzle 4 through a line 29, and to the vacuum stubs 30, 32. The pressure rising pump 20 is dimensioned such that, across the mixing nozzle 24, which is formed as a water jet pump, a pressure difference of about 1 to 1.5 bar between the pressure in the inlet stub 26 of the mixing nozzle 24 and the pressure in the discharge stub 28 of the mixing nozzle 24 is generated such that a vacuum region is created in the mixing nozzle by which vacuum the acrolein solution is sucked in.

The volume of the partial water stream BV is almost equal to the difference of the volume of the partial water stream BT sucked up by the pump, minus the volume of the sludge water stream BZ separated by the separation unit 12 by physical separation of solid material.

The one vacuum stub 30 is connected, via a line 34, with the hose reactor 36 comprising a discharge stub 38 and an input stub 40. The input stub 40 of the hose reactor 36 is connected, via a line 42, with the discharge stub 44 of the generator 46 which comprises an acrolein input stub 48, a disintegration catalyst input stub 50 and a water input stub 52.

A volume stream A of an acrolein derivative, for example acrolein acetal, is fed through the acrolein input stub 48 to the generator 46 depending on the volume of the partial water stream BT. A volume stream K of a disintegration catalyst is fed through the disintegration catalyst input stub 50 to the generator 46 depending from the volume stream A. A water stream W is fed through the water input stub 52 to the generator 46 depending on the volume stream A. A valve 56 for controlling the water intake is provided in a line 54 connected to the water input stub 53.

A branch line 58 runs from the water input stub 52 to the pressurized water line 22 and ends there in between the pump 20 and the mixing nozzle 24. If the valve 56 in the line 54 is open and the valve 60 in the line 58 is closed, the water is supplied from a clear water source (not shown). Alternatively, the generator 46 can also be operated through the line 58 with the partial stream of the partial water stream BV instead of with the water stream W. For this purpose, the valve 56 is closed and the valve 60 is opened.

The aqueous acrolein solution generated in the generator 46 by interaction of the water W, the disintegration catalyst K and the acrolein derivative A, flows from the discharge stub 44 of the generator 26 into the input stub 40 of the hose reactor 36 where the reaction of the reaction components is completed. The aqueous acrolein solution flows from the discharge stub 38 of the hose reactor 46 through the line 34 into the vacuum stub 30 of the mixing nozzle 32.

The volume stream of the aqueous acrolein solution supplied at the vacuum stub 30, meets the partial water stream BV supplied through the connection stub 36 and previously physically cleaned, in the mixing nozzle.

The acrolein containing water stream being generated in the mixing nozzle 24 leaves the mixing nozzle 24 through a discharge stub 28 and arrives through the line 29 at the ring nozzle 4 where the mixing with the main ballast water stream BW is carried out.

A tank 64 for dissolution accelerator is connected to the vacuum stub through a line 62. A pump 66 and a shutoff valve 68 are provided in the line 62 in this sequence between the tank 64 and the vacuum stub 32. The tank 64 is hydraulically connected through the line 63 to the suction stub of a pump 66. An input flange of the shutoff valve 68 is provided at the pressure stub of the pump 66. A discharge flange of the shutoff valve 68 is connected to the flange of the vacuum stub 32 of the mixing nozzle 24. Therefore, disintegration accelerator can be dosed from the tank 64, if needed by means of the pump 66 through the valve 68 through the line 62 to the vacuum stub 32.

Figure 2:
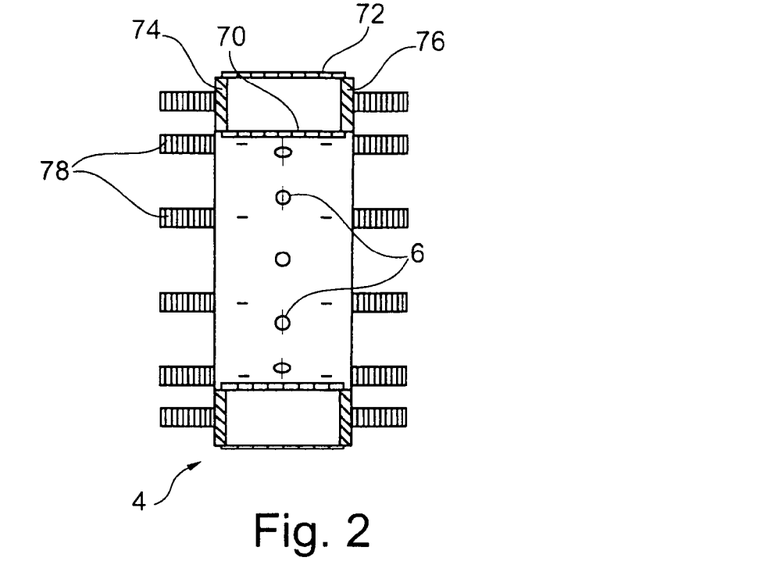
FIG. 2 shows schematically the ring nozzle in side elevation.

FIG. 2 shows schematically a second embodiment of the apparatus. This embodiment differs from the first embodiment in that the water supply for the mixing nozzle 24 and the generator 46 is carried out from a separate water source, for example from the usage water supply of the ship which is shown by the usage water tank 67. The usage water tank 67 is directly connected with the pressure rising pump 20 in this embodiment. The common feature of the two embodiments consists in that a acrolein containing water stream which is small in comparison to the main ballast water stream is supplied to the main ballast water stream with a high efficiency.

Figure 3:
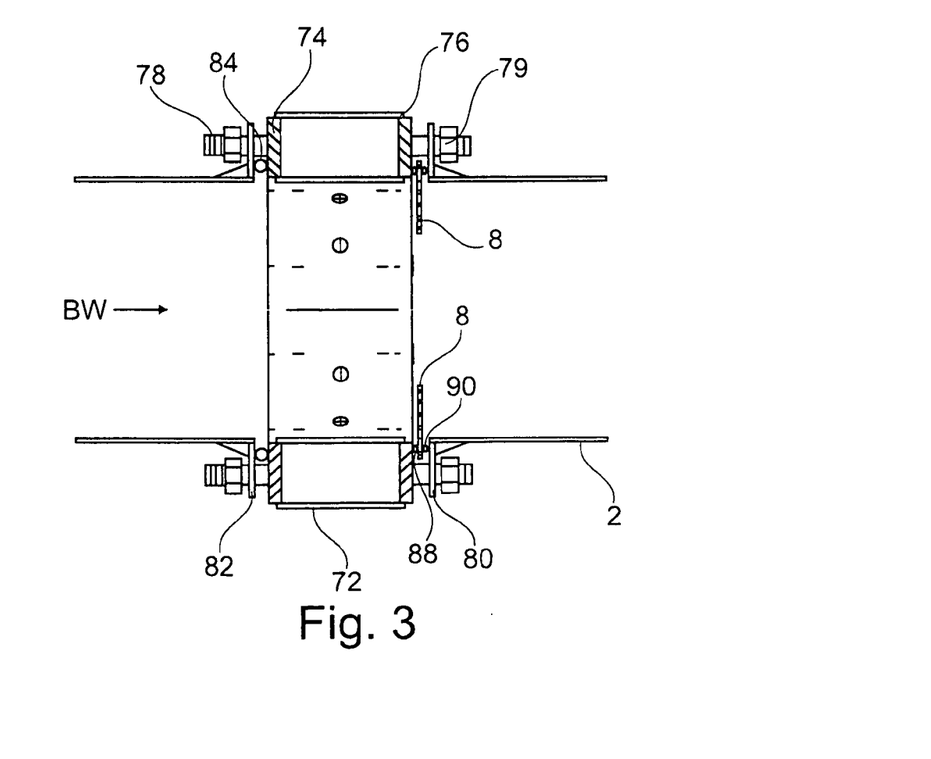
FIG. 3 shows schematically a ring nozzle inserted into a ballast water tube line together with the mixing face plate, FIG. 4 a perspective view of the ring nozzle with a tangentially arranged injector line, FIG. 5 a front view of the mixing face plate MB having a rectangular opening, and FIG. 6 a section of the mixing nozzle.

As can be seen from FIG. 3, the nozzle ring 5 of the ring nozzle 4 consists out of an inner tube section 70 which is provided with a plurality of nozzle openings 6 on its circumference, as well as out of an outer tube ring 72 and to flange rings 74 and 76. The flange rings 74 and 76 are fluid tightly welded in between the inner tube section 70 and the outer tube section 72. Upstanding bolts 78 are inserted into the flange rings 74 and 76, the bolts having threats so that, with the aide of nuts 79 (FIG. 4), an easy installation in existing ballast water lines is possible.

As can be seen from FIG. 3, the ring nozzle 4 is directly connected through the upstanding bolts 78 and the nuts 79 to the connecting flanges 80, 82 of the main ballast water line 2 such that the mixing face plate 8 is located in flow direction of the main ballast water stream BW behind the nozzle openings. Flange seals 84, 86 are provided between the ring nozzle 4 and the connecting flanges 80, 82. The mixing face plate 8 is arranged between the ring nozzle 4 and the connecting flange 80 of the main ballast water line 2, and it is sealed by means of two flat sealings 88, 90. The mixing face plate 8 is simply clamped upon fastening the nuts 79 on the upstanding bolts 78. Thereby, an easy connection of the ring nozzle 4 into the ballast water lines present on the ship is obtained.

Figure 4:
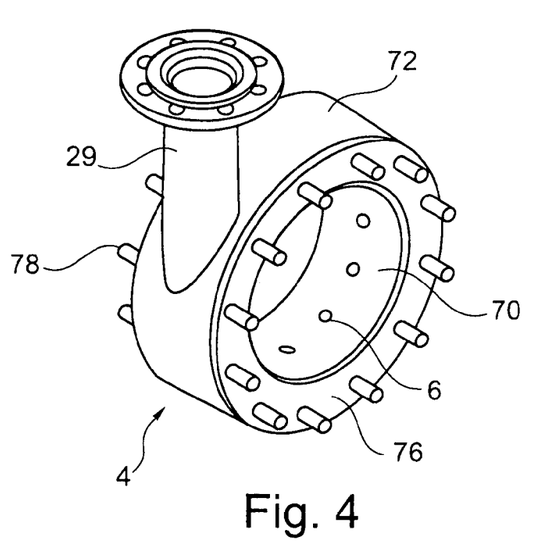

FIG. 4 shows the perspective view of the ring nozzle 4 and the line 29 tangentially arranged at the outer tube cover 72, which line 29 is arranged as injector line. The acrolein containing water stream which leaves the mixing nozzle 24 is under a pressure of about 1 to 1.5 bar such that the acrolein containing stream coming from the mixing nozzle 24 which is fed or injected under pressure in tangential direction through the line 29 into the nozzle ring of the ring nozzle 4 a circular stream is generated which insures that about the same amount of acrolein solution from the individual nozzle openings 6. Thereby, a unitary supply of acrolein solution into the main ballast water stream BW is done. The stream interfering device positioned downstream thereof, provides twirling and mixing of the acrolein solution with the main ballast water stream BW.

Figure 5:
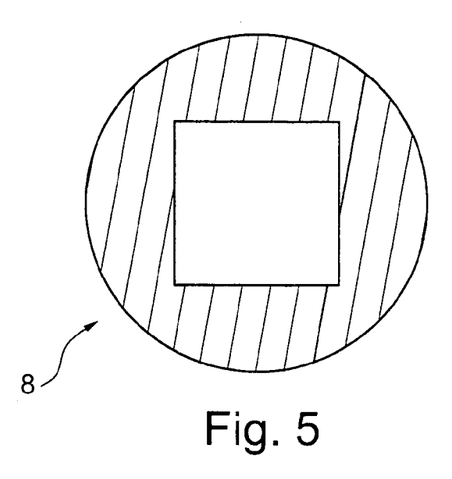

FIG. 5 shows, as preferred design of the stream interfering device, mixing face plate 8 having a non circular but rectangular opening 5. Thereby, the twirling and mixing, respectively, of the acrolein solution with the main ballast water stream is further improved as compared to a mixing plate having a circular opening.

Figure 6:
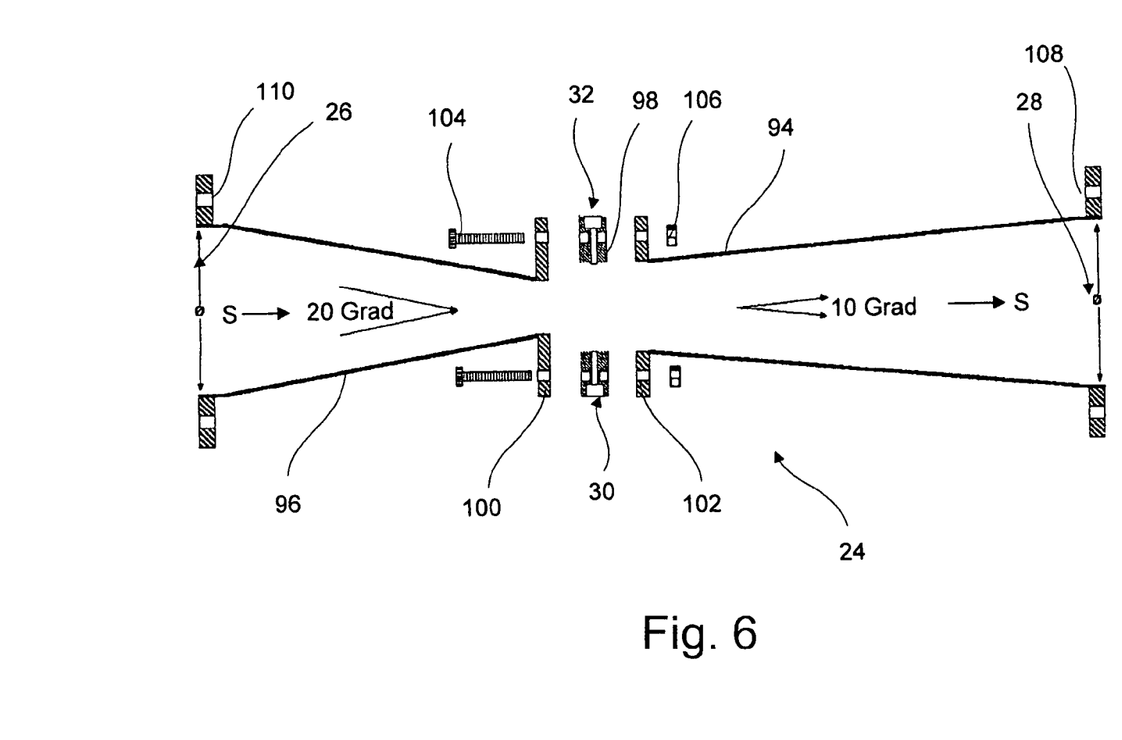

FIG. 6 schematically shows a mixing nozzle 24. The mixing nozzle 24 comprises an outlet cone 94 and an inlet cone 96 as well as an intermediate piece 98 which is arranged between a flange 100 on the outlet end of the inlet cone 96 and a flange 102 at the input and of the output cone 94. The flanges 100, 102 and the intermediate piece 98 are tightened with each other by screws 104 and nuts 106, as is shown in FIG. 6. The inlet cone 96 comprises an inlet port 26 for blast water, and the outlet cone 94 comprises an outlet opening 28. The suction stubs 30 and 32 in the intermediate piece 98 serve to connect the line 34 for acrolein solution and the line 62 for disintegration accelerator, respectively.

As is shown in FIG. 6, the inlet cone 96 has an opening angle of 20 degrees and the outlet cone 94 has an opening angle of 10 degrees. The inlet cone 96 of the mixing nozzle 24 has a diameter ratio in flow direction S from the inlet to the outlet, i.e. a restriction of the diameter area, of about 2:1, and the outlet cone has a diameter ration in flow direction S from the inlet to the outlet, i.e. a widening of the opening area, of about 1:2. The diameter of the inlet cone 96 had its input 26 and the diameter of the outlet cone 94 at its output 28 has the same size as the diameter of the connected tube line for ballast water. When the pressure rising pump 20 is designed for 45 kW, and if the pressure rising pump 20 is operating at its nominal power, the required speed of flow of 20 to 25 msec at the outlet end of the inlet cone 96 is achieved with an average of 500 m$^3$/h and a speed of flow of 2 to 3 msec.

The inlet cone 94 is connected to the ring nozzle 4 through a flange 98 with the supply line 29. The inlet stub 96 is connected through a flange 110 to the line 18 for the supply of ballast water.

It is to be understood that the above description is intended to be illustrative and not restrictive. Many embodiments will be apparent to those skilled in the art upon reviewing the above description. The scope of the invention should, therefore, be determined not as reference to the above description, but should instead be determined with reference to the appended claims along with the full scope of equivalence to which such claims are entitled.

LIST OF REFERENCE SIGNS 2 main ballast water line
4 ring nozzle
5 ring nozzle
6 nozzle opening
8 face plate
10 branch line
12 separation unit
14 control valve
16 discharge line
18 clear water line
20 pressure rising pump
22 pressure water line
24 mixing nozzle
26 input stub
28 discharge stub
29 feeding line
30 vacuum stub
32 vacuum stub
34 line
36 hose reactor
38 discharge stub
40 input stub
42 line
44 discharge stub
46 generator
48 input stub
50 catalyzer input stub
52 water input stub
53 water input stub
54 line
56 valve
58 branch line
60 valve
62 tube line 64 tank
66 pump
67 usage water tank
68 shutoff valve
70 inner tube section
72 outer tube ring
74 flange ring
76 flange ring
78 upstanding bolts
79 nuts
80 connecting flange
82 connecting flange
84 flange seal
86 flange seal
88 flat sealing
90 flat sealing
92 opening
94 outlet cone
96 inlet cone
98 intermediate piece
100 flange
102 flange
104 screws
106 nuts
110 flange

What is claimed is:

1. An apparatus for treating ballast water with acrolein on board of a ship wherein the apparatus comprises
a connection to the main ballast water line (2) of a ballast water installation,
a reactor device on a deck of the ship having a connection (48) for an acrolein derivative, a connection (50) for a catalyst acid and a connection (53) for water for generating an aqueous acrolein solution,
a branch line (10) next to the main ballast water line (2) which is connected to the main ballast water line (2) for branching off a ballast water partial stream and for returning the branched off ballast water partial stream,
a mixing device (24) that is connected in the branch line (10) for diluting the acrolein solution generated by the reactor device;
an acrolein solution supply line (34, 42) from the reactor device on the deck of the ship to the mixing device (24) in the branch line (10) next to the main ballast water line (2); and
a feed device (4) in the main ballast water line (2) for supplying the diluted aqueous acrolein solution from the mixing device (24) to the main ballast water line (2).

2. The apparatus according to claim 1, characterized in that the reactor device comprises a generator (46) having at least a connecting stub (48) for acrolein derivative and a connecting stub (52) for pure water and an outlet stub (44) for acrolein solution wherein the generator (46) is designed for a preliminary mixing of the acrolein derivative with water, and a hose reactor (36) having an inlet stub connected to the outlet stub of the generator (46) by means of a conduit, and an outlet stub for advancing the treated acrolein solution and the volume of which is designed for providing a retention time of the acrolein solution in the hose reactor (36) within which time the solution and the hydrolysis respectively of the acrolein derivative in water is finished.

3. The apparatus according to claim 1, the characterized in that the mixing device comprises a mixing nozzle (24) having an inlet cone (96) coming narrower in the flow direction which has an input stub for connecting to a pressure water line (22), an outlet cone (94) widening in the flow direction having an outlet sub for the connection of a line (29) for feeding the aqueous acrolein solution from the mixing device to a destination location, as well as a suction stub (30) leading to the low pressure of the mixing nozzle (24) which is connected to the acrolein solution supply line (34) from the reactor device for generating an aqueous acrolein solution, and a pressure enlarging pump (20) which is arranged upstream of the mixing nozzle (24) and is connected to the ballast water branch line, whereby the power of the pressure elevating pump (20) is dimensioned in relation to the narrowing of the inlet cone (96) of the mixing nozzle (24) such that the nominal power of the pressure elevating pump (20) in the area of the mixing nozzle (24) in between the inlet cone (96) and the outlet cone (94) a speed of the water stream of 20 to 25 msec can be achieved.

4. The apparatus according to claim 1, characterized in that the feeding device comprises an annular nozzle (4) which is dimensioned for usage in the main ballast water line (2), wherein the annular nozzle (4) comprises a nozzle ring comprising a plurality of nozzle openings (6) distributed over the interior circumference of the nozzle ring.

5. A method of treating ballast water with acrolein on board of a ship, wherein an acrolein derivative, a catalyst acid and hydrolysis water are mixed in a reactor device on a deck of the ship for generating an aqueous acrolein solution,
the aqueous acrolein solution generated in the reactor device is mixed and diluted in a partial ballast water stream branched off from the main ballast water stream of a main ballast water line by a branch line at a branching location wherein
the aqueous acrolein solution generated in the reactor device is fed from the reactor device on the deck of the ship to a mixing device provided in the branch line next to the main ballast water line; and
wherein the partial ballast water stream is fed through the mixing device to mix with the aqueous acrolein solution and then fed back to the main to the main ballast water stream downstream of the branching location.

6. The method according to claim 5, characterized in that an additional disintegration catalyst is fed to the reactor device for generating an aqueous acrolein solution.

7. The method according to claim 5, characterized in that a disintegration accelerator is additionally fed to the partial ballast water stream.

8. The method according to claim 5, characterized in that the partial ballast water stream is about 10% of the main ballast water stream.

9. The method according to claim 5, characterized in that, the nominal content of the acrolein in the acrolein treated main ballast water stream amounts to a concentration of about 15 ppm and the partial ballast water stream is 10% of the main ballast water stream, the ratio of acrolein derivative and hydrolysis water at the reactor device is selected such that the acrolein solution leaving the reactor device has a concentration of 150000 ppm acrolein, and that the partial ballast water stream after mixing with the acrolein solution has a concentration of 150 ppm acrolein.

10. The method according to claim 5, characterized in that the acrolein solution exiting the reactor device is diluted upon mixing with the partial ballast water stream in a ratio of 1:500 to 1:1000 by means of the partial ballast water stream and that the partial ballast water stream treated with the acrolein is diluted in a ratio of about 1:5 to 1:10 by means of the main ballast water stream and the nominal content of the acrolein in the main ballast water stream treated with acrolein amounts to about 5 to 15 ppm and the partial ballast water stream is 10% of the main ballast water stream.

11. Method according to claim 5, characterized in that a mixing nozzle is used for mixing the partial ballast water stream and the acrolein solution.

12. The method according to claim 11, is characterized in that the pressure and the flow speed of the partial ballast water stream are selected such that a water flow speed of 20 to 25 msec is achieved in the mixing nozzle.

* * * * *